(12) United States Patent
Fisher et al.

(10) Patent No.: US 9,176,574 B2
(45) Date of Patent: *Nov. 3, 2015

(54) SYSTEM AND METHOD FOR ACCESSING AND UTILIZING ANCILLARY DATA WITH AN ELECTRONIC CAMERA DEVICE

(71) Applicants: Sony Corporation, Tokyo (JP); Sony Electronics Inc., Park Ridge, NJ (US)

(72) Inventors: Clay Fisher, San Diego, CA (US); Steven Goldstein, Los Angeles, CA (US); Neal Manowitz, Woodcliff Lake, NJ (US); David Longendyke, Vernon, NJ (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,638

(22) Filed: Jan. 6, 2014

(65) Prior Publication Data

US 2014/0118564 A1    May 1, 2014

Related U.S. Application Data

(63) Continuation of application No. 13/682,872, filed on Nov. 21, 2012, which is a continuation of application No. 09/781,917, filed on Feb. 8, 2001, now Pat. No. 8,345,105.

(60) Provisional application No. 60/187,185, filed on Mar. 6, 2000.

(51) Int. Cl.
*H04N 5/225* (2006.01)
*G06F 3/00* (2006.01)
*H04N 1/00* (2006.01)
*H04N 5/232* (2006.01)

(52) U.S. Cl.
CPC ............ *G06F 3/005* (2013.01); *H04N 1/00127* (2013.01); *H04N 1/00129* (2013.01); *H04N 1/00148* (2013.01); *H04N 1/00161* (2013.01); *H04N 1/00172* (2013.01); *H04N 1/00177* (2013.01); *H04N 1/00185* (2013.01)

(58) Field of Classification Search
CPC .......... H04N 5/23203; H04N 5/23206; H04N 1/00204
USPC ............ 348/207.1, 211.1, 211.2, 231.99, 239
See application file for complete search history.

(56) References Cited

U.S. PATENT DOCUMENTS

| | | | | |
|---|---|---|---|---|
| 5,477,264 A | * | 12/1995 | Sarbadhikari et al. | 348/231.6 |
| 5,633,678 A | * | 5/1997 | Parulski et al. | 348/231.5 |
| 5,717,496 A | * | 2/1998 | Satoh et al. | 358/402 |
| 5,734,425 A | * | 3/1998 | Takizawa et al. | 348/231.9 |

(Continued)

*Primary Examiner* — Kelly L Jerabek
(74) *Attorney, Agent, or Firm* — Sony Corporation

(57) ABSTRACT

A system and method for accessing and utilizing ancillary data with an electronic camera device includes a data source that stores various selectable ancillary data files such as image template files, text overlay files, image background files, and special program instruction files. The data source may be implemented in any effective manner, including as a service on an distributed computer network like the Internet, as a discrete electronic device such as a personal computer, or as a removable, non-volatile memory device such as a flash memory. The electronic camera device may then utilize an ancillary data module to access, select, and download the ancillary data files from the data source for subsequently combining with other captured image data to thereby produce new composite images.

18 Claims, 8 Drawing Sheets

(56) References Cited

U.S. PATENT DOCUMENTS

| | | | |
|---|---|---|---|
| 5,938,766 A * | 8/1999 | Anderson et al. | 713/100 |
| 6,006,039 A * | 12/1999 | Steinberg et al. | 396/57 |
| 6,104,430 A * | 8/2000 | Fukuoka | 348/231.6 |
| 6,177,957 B1 * | 1/2001 | Anderson | 348/231.99 |
| 6,195,511 B1 * | 2/2001 | Harada | 396/300 |
| 6,223,190 B1 * | 4/2001 | Aihara et al. | 715/234 |
| 6,360,362 B1 * | 3/2002 | Fichtner et al. | 717/168 |
| 6,396,537 B1 * | 5/2002 | Squilla et al. | 348/239 |
| 6,628,325 B1 * | 9/2003 | Steinberg et al. | 348/211.1 |
| 6,721,001 B1 * | 4/2004 | Berstis | 348/231.3 |
| 6,731,305 B1 * | 5/2004 | Park et al. | 345/629 |
| 6,750,902 B1 * | 6/2004 | Steinberg et al. | 348/211.3 |
| 6,894,694 B1 * | 5/2005 | Silverbrook et al. | 345/581 |
| 6,930,709 B1 * | 8/2005 | Creamer et al. | 348/211.3 |
| 6,950,130 B1 * | 9/2005 | Qian | 348/239 |
| 6,968,058 B1 * | 11/2005 | Kondoh et al. | 380/200 |
| 8,345,105 B2 * | 1/2013 | Fisher et al. | 348/207.1 |
| 2003/0128273 A1 * | 7/2003 | Matsui et al. | 348/51 |
| 2013/0113946 A1 * | 5/2013 | Fisher et al. | 348/207.1 |

* cited by examiner

SYSTEM AND METHOD FOR ACCESSING AND UTILIZING ANCILLARY DATA WITH AN ELECTRONIC CAMERA DEVICE

CROSS-REFERENCE TO RELATED APPLICATIONS

This application relates to, and claims priority in, U.S. Provisional Patent Application Ser. No. 60/187,185, entitled "Download A Web Page Into Camera," filed on Mar. 6, 2000, and also as a Continuation Application to U.S. Non-Provisional patent application Ser. No. 09/781,917, entitled "System And Method For Accessing And Utilizing Ancillary Data With An Electronic Camera Device," filed on Feb. 8, 2001, and also as a Continuation Application to U.S. Non-Provisional patent application Ser. No. 13/682,872, entitled "System And Method For Accessing And Utilizing Ancillary Data With An Electronic Camera Device," filed on Nov. 21, 2012. The foregoing related applications are commonly assigned, and are hereby incorporated by reference.

BACKGROUND SECTION

1. Field of the Invention

This invention relates generally to techniques for managing information, and relates more particularly to a system and method for accessing and utilizing ancillary data with an electronic camera device.

2. Description of the Background Art

Implementing efficient methods for accessing and utilizing information is a significant consideration for designers and manufacturers of contemporary electronic devices. However, effectively accessing and utilizing information by utilizing electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic device that effectively captures, processes, and stores digital image data may benefit from an efficient implementation because of the large amount and complexity of the digital data involved.

Due to factors like the growing demands on system functionality, it is apparent that developing new techniques for accessing and utilizing information is a matter of concern for related electronic technologies. Therefore, for all the foregoing reasons, developing effective systems for accessing and utilizing information remains a significant consideration for designers, manufacturers, and users of contemporary electronic devices.

SUMMARY

In accordance with the present invention, a system and method are disclosed for accessing and utilizing ancillary data with an electronic camera device. Initially, in one embodiment, one or more ancillary data files may preferably be created by any appropriate entity and stored in a particular data source. For example, in one embodiment, a system user may create various ancillary data files on a discrete computer device for subsequent downloading and utilization by the camera device. Alternately, a manufacturer may create various ancillary data files, and make the ancillary data files available on a distributed computer network like the Internet for subsequent downloading and utilization by the camera device.

Next, the camera device may preferably establish an electronic communication path with the foregoing data source in any appropriate manner to thereby access one or more ancillary data files. The electronic communication path between the data source and the camera device may be established using any effective technique. For example, the camera device may access and download one or more ancillary data files using a removable non-volatile memory device, a hard-wired connection, or a wireless connection. Similarly, the camera device may access and download one or more ancillary data files from a either a stand-alone electronic device like a personal computer, or a distributed computer network like the Internet.

Then, the camera device may perform various on-line management procedures with the ancillary data files by means of the previously-established electronic communication path. The on-line management procedures may include any appropriate processes or functionalities. For example, a download manager from the ancillary data module of the camera device may advantageously select and download one or more of the ancillary data files from the data source. In certain embodiments, a system user may interactively view, manipulate, select, and download the ancillary data files from the data source.

After the download manager preferably downloads and locally stores one or more selected ancillary data files, the electronic communication path between the data source and the camera device may be terminated. Then, the ancillary data module may preferably analyze the downloaded ancillary data file(s), and coordinate any required off-line file management procedures, either automatically or through an interactive process involving a system user.

In certain embodiments, the ancillary data module may preferably analyze one or more descriptors corresponding to the downloaded ancillary data files to identify relevant information regarding the downloaded ancillary data files. A display manager may responsively update camera device menus for display in a camera viewfinder to thereby include any changes in the locally-stored ancillary data files.

Finally, a system user may advantageously utilize the downloaded ancillary data files in the camera device. For example, a system user may combine one or more downloaded ancillary data files in the camera device with corresponding captured image data to thereby produce a new composite image. In certain embodiments, a display manager may display one or more selected ancillary data files in the camera viewfinder while a system user positions and captures associated image data. In alternate embodiments, an editing module from the ancillary data module may allow a system user to view and edit a composite image of one or more selected ancillary data files and one or more selected captured images from data storage of the camera device. The present invention therefore provides an improved system and method for accessing and utilizing ancillary data with an electronic camera device.

DETAILED DESCRIPTION

The present invention relates to an improvement in data access and management techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for accessing and utilizing ancillary data with an electronic camera device, and preferably includes a data source that may store various selectable ancillary data files such as image template files, text overlay files, image background files, and special program instruction files. The data source may be implemented in any effective manner, including as a service on an distributed computer network like the Internet, as a discrete electronic device such as a personal computer, or as a removable, non-volatile memory device such as a flash memory. The electronic camera device may preferably then utilize an ancillary data module to access, select, and download the ancillary data files from the data source for subsequently combining with other captured image data to thereby produce new composite images.

Figure 1:
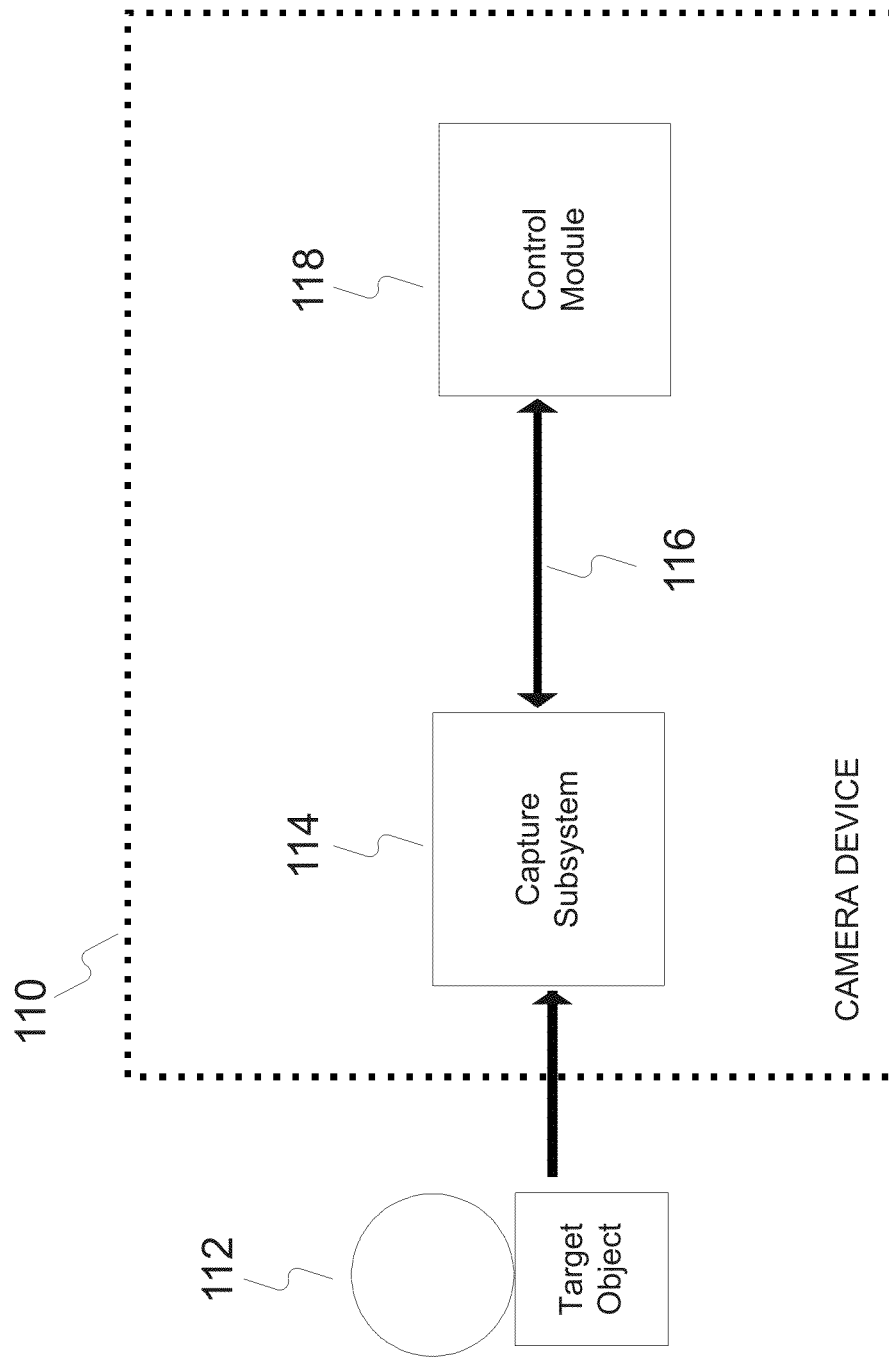
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as another type of portable electronic device, such as a hand-held personal digital assistant device.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
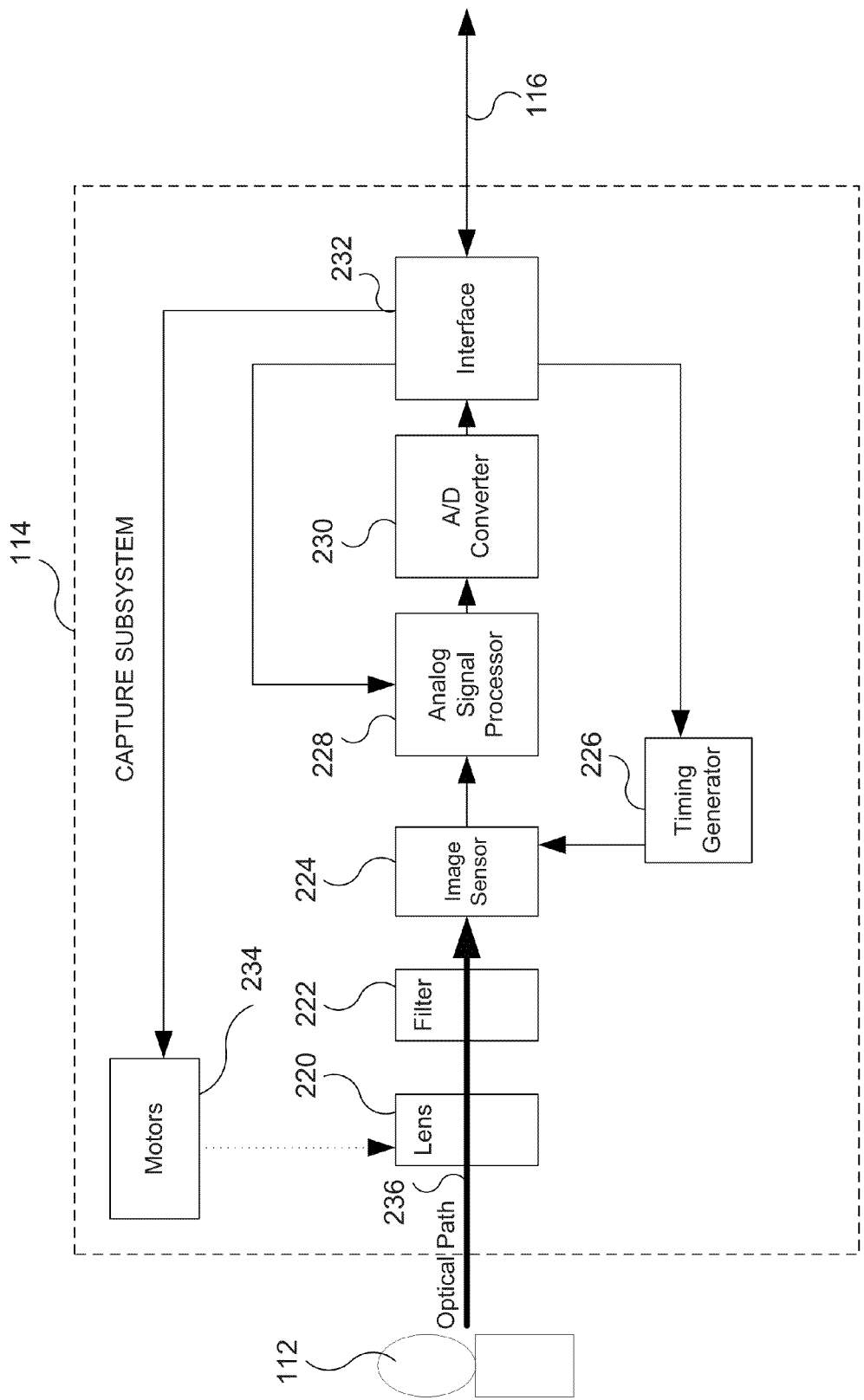
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises a lens 220 having an iris (not shown), a filter 222, an image sensor 224, a timing generator 226, an analog signal processor (ASP) 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through ASP 228, A/D converter 230, and interface 232. Interface 232 may preferably include separate interfaces for controlling ASP 228, motors 234 and timing generator 226.

From interface 232, the image data passes over system bus 116 to control module 118 for appropriate processing and storage.

Figure 3:
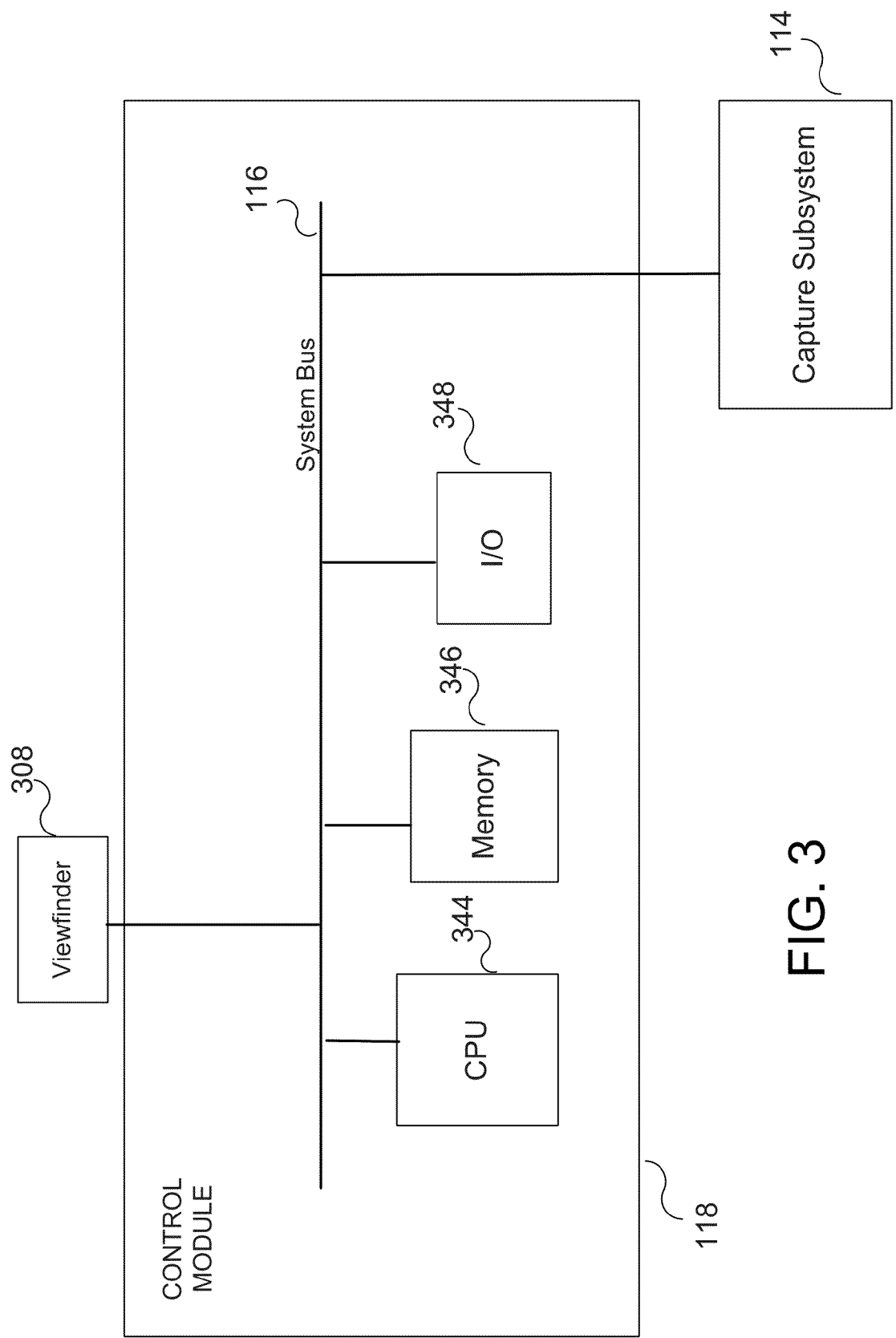
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. In accordance with the present invention, camera device 110 may advantageously access and download various types of ancillary data from various data sources by utilizing I/O 348. The operation and utilization of control module 118 is further discussed below in conjunction with FIGS. 4 through 8.

Figure 4:
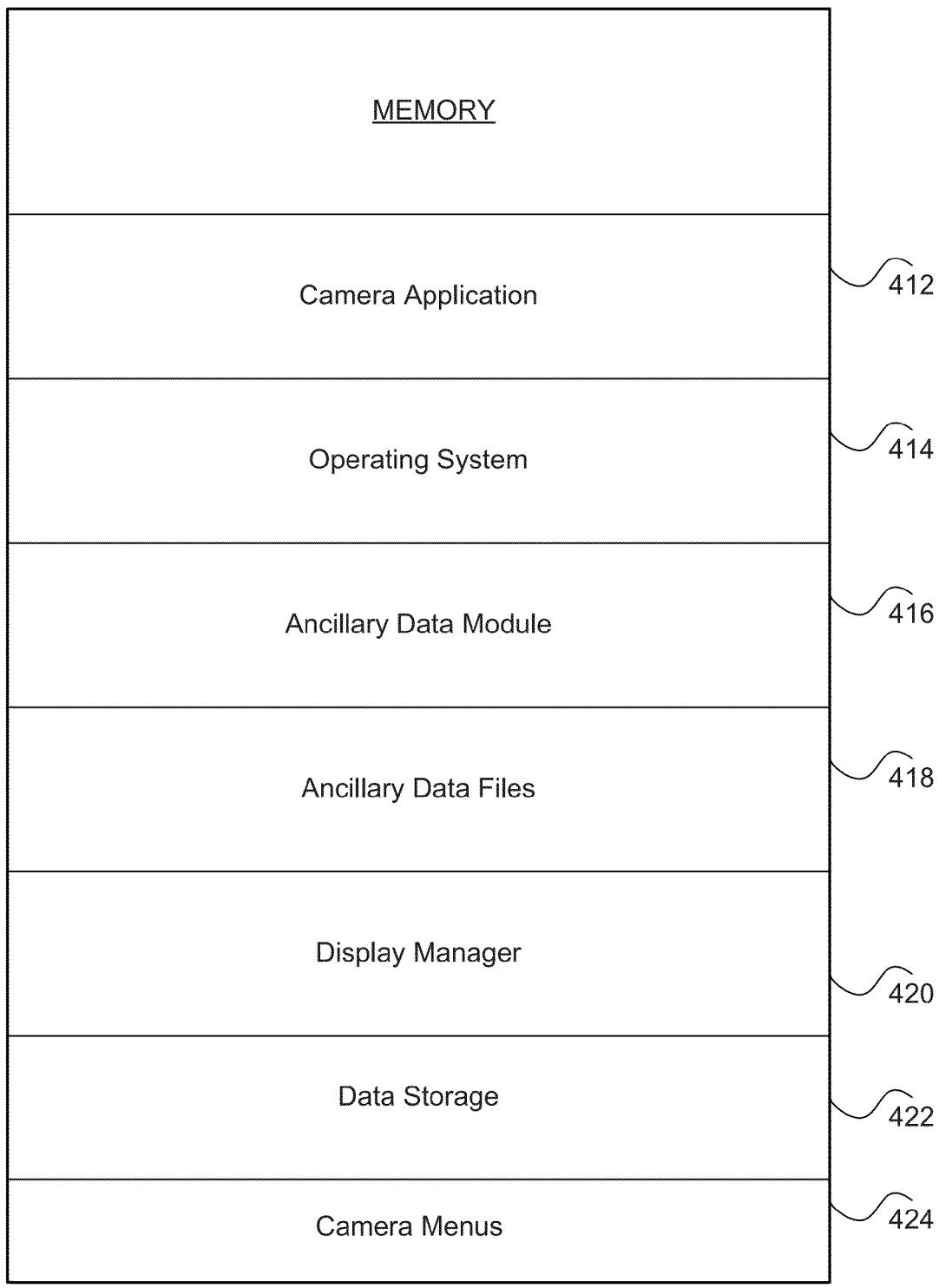
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 preferably includes, but is not limited to, camera application 412, an operating system 414, an ancillary data module 416, ancillary data files 418, a display manager 420, data storage 422, and camera menus 424. In alternate embodiments, memory 346 may readily include various other components in addition to, or instead of, those components discussed in conjunction with the FIG. 4 embodiment.

In the FIG. 4 embodiment, camera application 412 may include software instructions that are preferably executed by CPU 344 (FIG. 3) to perform various functions and operations for camera device 110. The particular nature and functionality of camera application 412 preferably varies depending upon factors such as the specific type and particular use of the corresponding camera device 110.

In the FIG. 4 embodiment, operating system 414 preferably controls and coordinates low-level functionality of camera device 110. In accordance with the present invention, ancillary data module 416 may preferably control and coordinate ancillary data management procedures to download various types of ancillary data from various external data sources and camera device 110. The operation and functionality of ancillary data module 416 is further discussed below in conjunction with FIGS. 5 through 8.

Ancillary data files 418 may preferably include any appropriate information, data, or instructions to facilitate successful operation of camera device 110. In the FIG. 4 embodiment, ancillary data files 418 may preferably include various types of information for combining with image data that is captured by camera device 110 to thereby produce composite images. The configuration and utilization of ancillary data files 418 are further discussed below in conjunction with FIGS. 7 and 8.

In the FIG. 4 embodiment, display manager 420 preferably may access various types of information and responsively display the information upon viewfinder 308, in accordance with the present invention. Data storage 422 may preferably include individual sets of image data that are each captured by camera device 110. Camera menus 424 may preferably include any appropriate listings of information and functionalities pertaining to camera device 110. For example, camera menus 424 may be displayed upon viewfinder 308 to allow a system user to download, view, manage, and utilize various ancillary data files 418.

Figure 5:
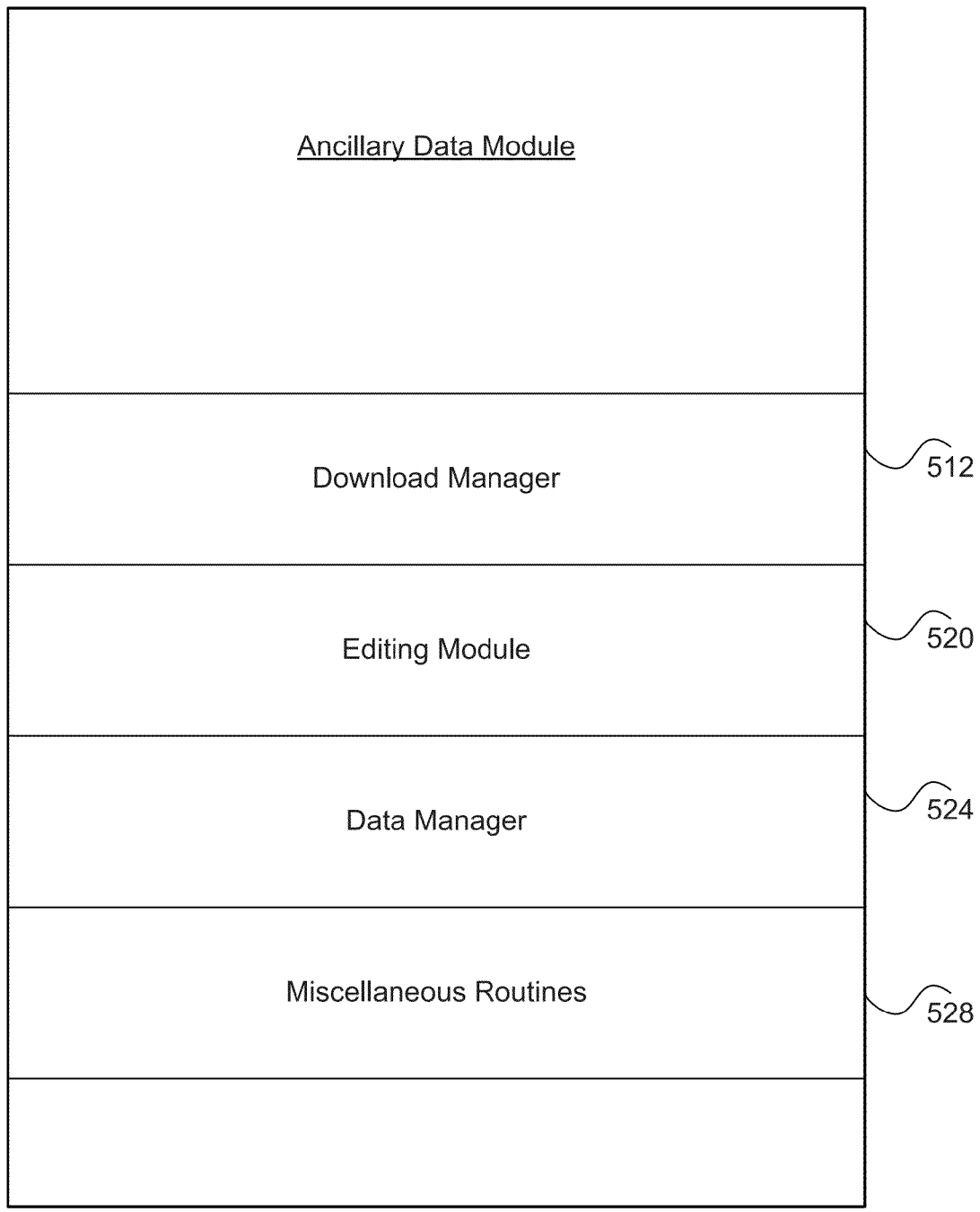
FIG. 5 is a block diagram for one embodiment of the ancillary data module of FIG. 4, in accordance with the present invention.

Referring now to FIG. 5, a block diagram for one embodiment of the FIG. 4 ancillary data module 416 is shown, in accordance with the present invention. In the FIG. 5 embodiment, ancillary data module 416 preferably may include, but is not limited to, a download manager 512, an editing module 520, a data manager 524, and miscellaneous routines 528. In alternate embodiments, ancillary data module 416 may readily include various other components in addition to, or instead of, those components discussed in conjunction with the FIG. 5 embodiment.

In the FIG. 5 embodiment, download manager 512 preferably may coordinate the accessing, selecting, downloading, analyzing, and storing of various types of ancillary data files 418 from any appropriate data source. For example, download manager 416 may access various ancillary data files 418 from a location or service on a distributed computer network such as the Internet. Download manager 512 may then responsively identify and store the downloaded ancillary data files 418 into memory 116 of camera device 110.

In the FIG. 5 embodiment, editing module 520 may preferably control various editing procedures for editing and combining ancillary data files 418 with captured image data from data storage 422 of camera device 110. For example, editing module 320 may be utilized to combine various ancillary data files 418 (such as image transitions, image templates, text overlays, Internet web pages, or image backgrounds) with individual captured images stored in data storage 422 of memory 346.

In the FIG. 5 embodiment, data manager 524 preferably may manage ancillary data files 418 and captured image data in data storage 422. For example, data manager 524 may create and restructure ancillary data files 418 into various directories and folders to effectively facilitate access and utilization of newly-downloaded ancillary data files 418 by a system user.

Miscellaneous routines 528 may include any desired software instructions to facilitate various functions performed by ancillary data module 416 for camera device 110. For example, miscellaneous routines 528 may include a data transformation routine that translates a downloaded format of a particular ancillary data file 418 into a converted version of the same ancillary data file 418 that is then compatible with camera device 110.

Figure 6:
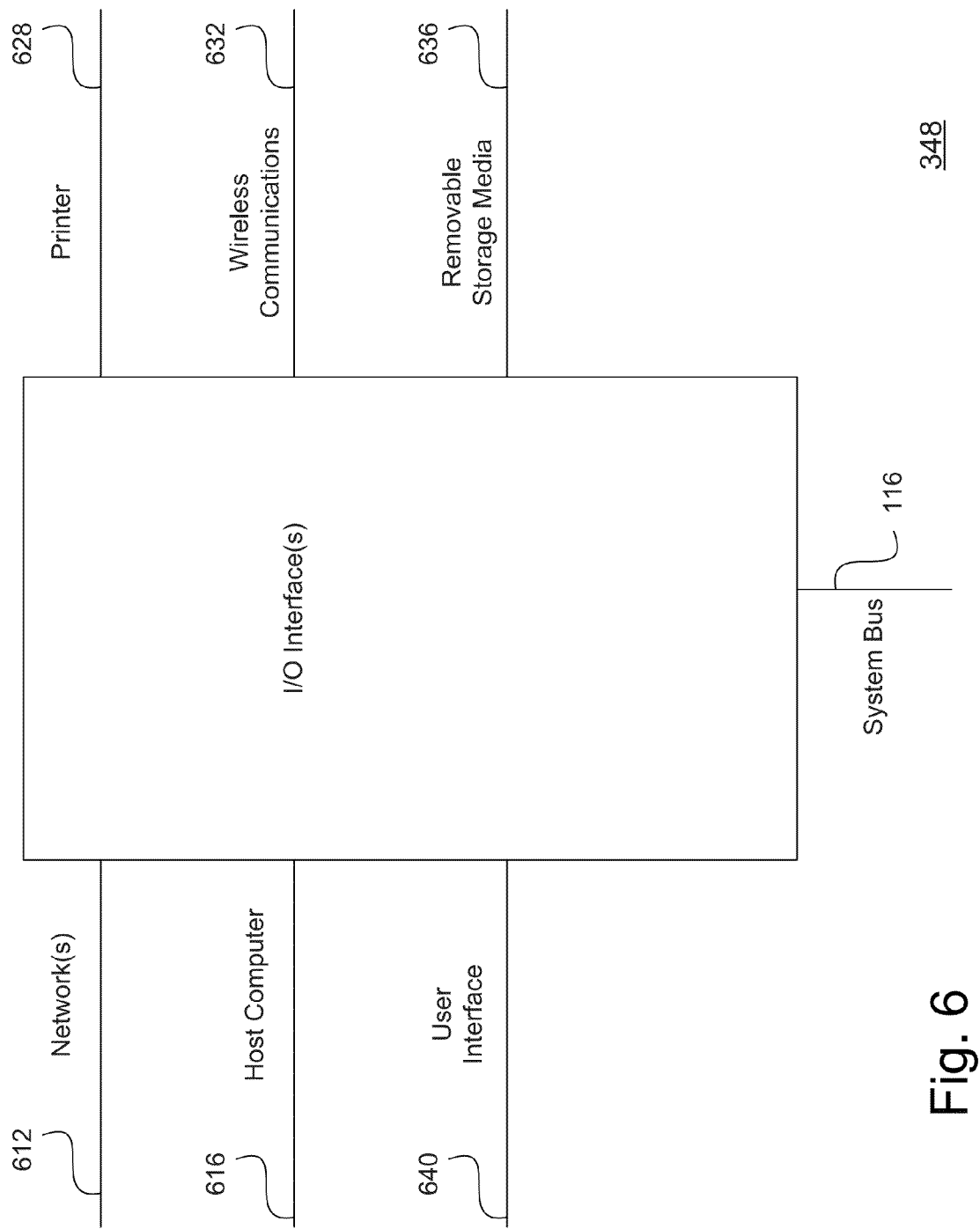
FIG. 6 is a block diagram for one embodiment of the I/O interface(s) of FIG. 3, in accordance with the present invention.

Referring now to FIG. 6, a block diagram for one embodiment of the FIG. 3 I/O interface(s) (I/O) 348 is shown, in accordance with the present invention. In the FIG. 6 embodiment, I/O interface(s) 348 preferably may communicate with various input or output entities that may include, but are not limited to, network(s) 612, a host computer 616, a printer 628, wireless communications 632, removable storage media 636, and a user interface 640. I/O interface(s) 348 may preferably communicate with camera device 110 via system bus 116. In alternate embodiments, I/O interface(s) 348 may readily include various other elements and functionalities in addition to, or instead of, those discussed in conjunction with the FIG. 6 embodiment. In addition, I/O interface(s) 348 may be implemented and configured using any effective technology or method.

In the FIG. 6 embodiment, camera device 110 may utilize I/O interface(s) 348 to bi-directionally communicate with one or more network(s) 612. For example, camera device 110 may advantageously communicate with the Internet or other distributed computer networks to download various types of ancillary data files 418. Camera device 110 may also utilize I/O interface(s) 348 to bi-directionally communicate with a host computer 616. For example, camera device 110 may communicate with a personal computer device over a Universal Serial Bus (USB) to effectively download various types of ancillary data files 418.

In the FIG. 6 embodiment, camera device 110 may also utilize I/O interface(s) 348 to bi-directionally communicate with various types of wireless communications 632. Wireless communications 632 preferably may include any effective means to remotely communicate with an external entity such as an Internet server, to thereby download various types of ancillary data files 418 and other information from a wireless data source. Wireless communications 632 may be implemented using any appropriate wireless technology, including radio-frequency transmission, infra-red transmission, or micro-wave transmission.

In the FIG. 6 embodiment, removable storage media 636 may preferably be utilized to receive or provide any desired information for facilitating the operation of camera device 110. For example, removable storage media 636 may provide means for bi-directional transfers of information between camera device 110 and other appropriate entities, such as a discrete personal computer device. In certain embodiments, removable storage media 636 may include memory devices to support any desired type or combination of removable storage media. For example, removable storage media 636 may include memory sticks, flash memory devices, compact disks, mini-disks, or floppy disks.

In addition to the various foregoing enumerated types of I/O interface(s) 348, camera device 110 preferably may also include any required types of interfaces or connectors (not shown) for coupling camera device 110 and other electronic devices or entities to thereby support bi-directional electronic communications.

In the FIG. 6 embodiment, user interface 640 preferably may include any effective means to allow a system user to communicate with camera device 110. For example, user interface 640 may support a keyboard device, a wireless remote control device, a speech-recognition module with corresponding microphone, a graphical user interface with touch-screen capability, or a selection button array mounted externally on camera device 110.

Figure 7:
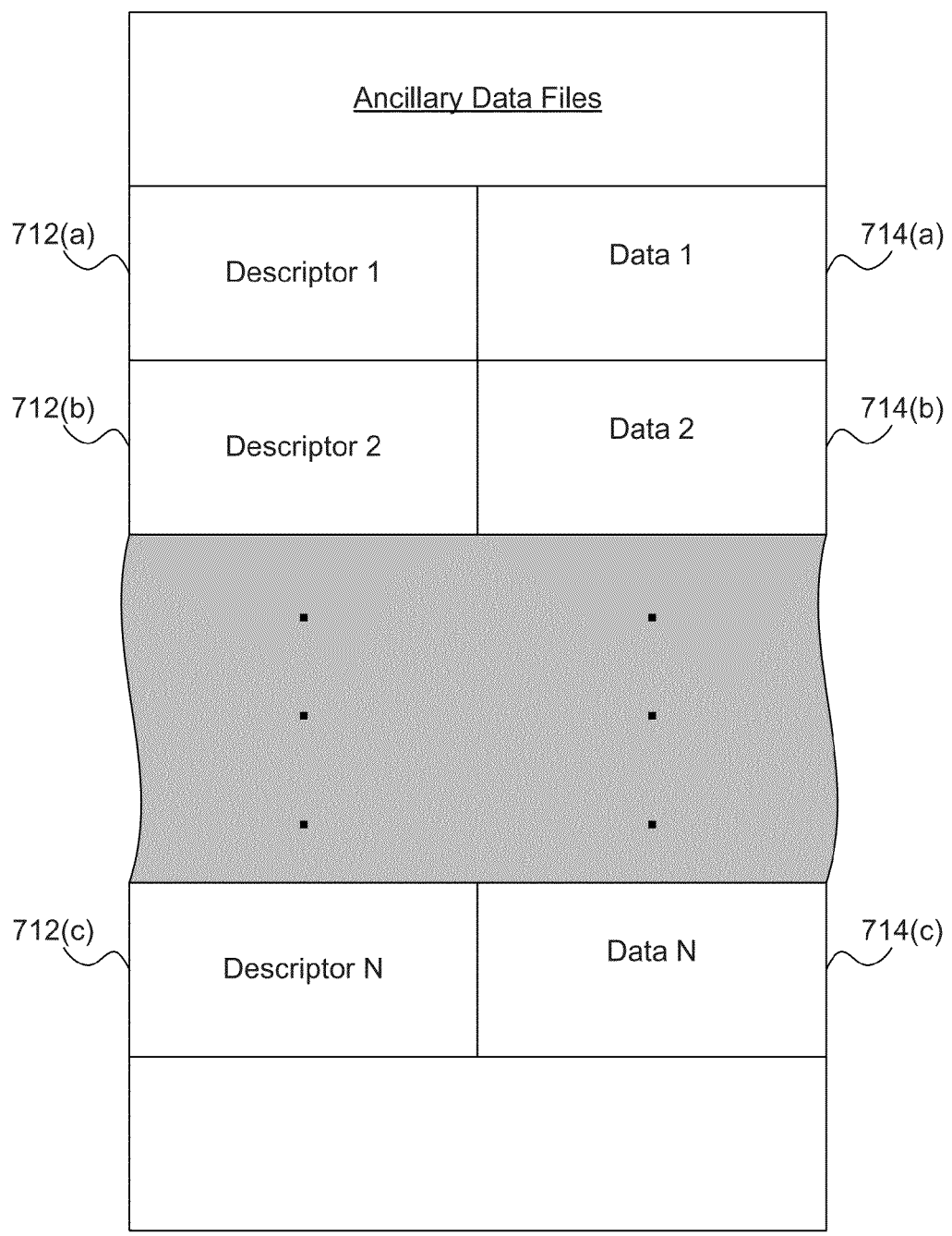
FIG. 7 is a block diagram for one embodiment of the ancillary data files of FIG. 4, in accordance with the present invention.

Referring now to FIG. 7, a block diagram for one embodiment of the FIG. 4 ancillary data files 418 is shown, in accordance with the present invention. In alternate embodiments of the present invention, ancillary data files 418 may readily be implemented to include various other configurations, and may also include various items and components that are different from those discussed in conjunction with the FIG. 7 embodiment.

In the FIG. 7 embodiment, ancillary data files 418 preferably may include individual sets of data 1 (714(*a*)) through data N (714(*c*)) that each preferably corresponds with a specific type of ancillary data. In the FIG. 7 embodiment, ancillary data files 418 may preferably also include a descriptor 1 (712(*a*)) through a descriptor N (712(*c*)) that are each preferably associated with a different respective set of data 714.

In the FIG. 7 embodiment, each of the sets of data 714 may preferably include any appropriate information, data, or program instructions to facilitate successful operation of camera device 110. In the FIG. 7 embodiment, ancillary data files 418 may preferably include various types of information for combination with image data that is captured by camera device 110 to thereby produce composite images. For example, ancillary data files 418 may include one or more template files (such as still templates, animated templates, voice-annotated templates) that may be utilized as a setting or a framework for presenting one or more images captured by camera device 110. Ancillary data files 418 may also include one or more text overlay files that may be superimposed upon an image captured by camera device 110. In addition, ancillary data files 418 may also include background files that include visual background data for combining with one or more images that are captured by camera device 110.

Furthermore, ancillary data files 418 may include special program instructions that directly enable or instruct camera device 110 how to utilize corresponding downloaded ancillary data files 418. For example, a particular set of downloaded data 714 may include template data and special instructions that instruct camera device 110 how to successfully combine various sets of captured image data with the downloaded template data.

Ancillary data files 418 may be implemented using any effective format. For example, in certain embodiments, ancillary data files 418 may include information that is formatted in a hypertext markup language (HTML) or an extensible markup language (XML). In addition, the special program instructions may be configured as a separate file or may be embedded in an ancillary data file 418 that also includes an associated set of graphics information, such as a template file that imaging device 110 may then combine with captured image data according to the downloaded special program instructions. In alternate embodiments, ancillary data files 418 may also include one or more web pages from the Internet.

In the FIG. 7 embodiment, descriptors 712 may include any appropriate information related to a corresponding set of data 714. For example, a descriptor 712 may include information regarding the nature of the associated data 714, such at a data format or a data type. Descriptor 712 may also include information regarding how the associated data 714 is organized, such at a data structure or a data size. In accordance with the present invention, ancillary data module 416 may advantageously analyze downloaded ancillary data files 418 using descriptors 712 and other means to thereby update camera menus 424, and otherwise provide current information to a system user for effectively utilizing the ancillary data files 418.

Figure 8:
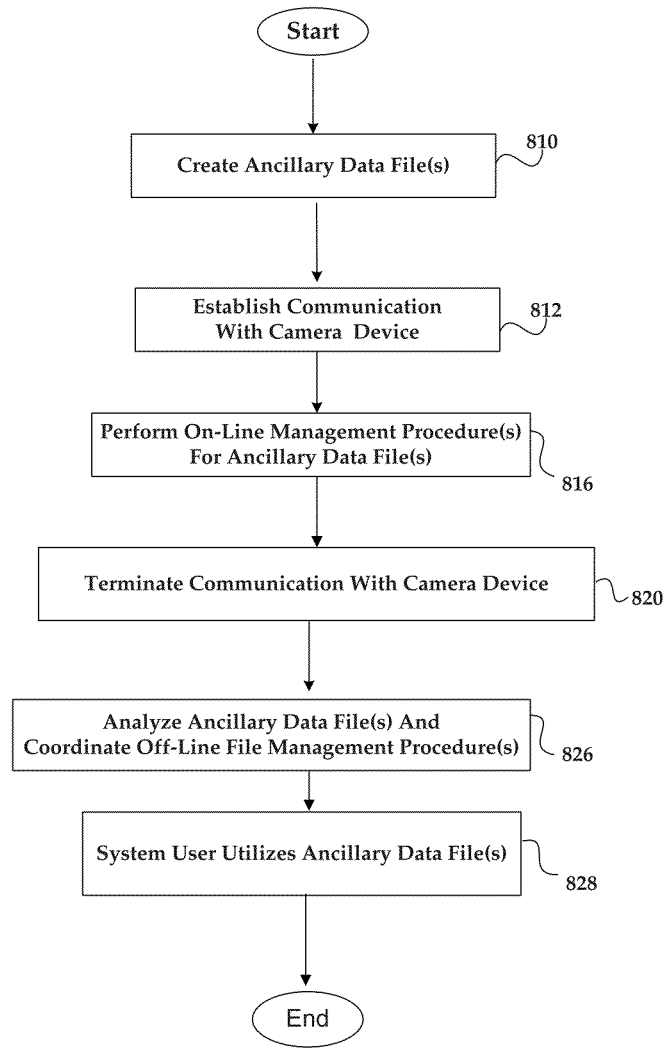
FIG. 8 is a flowchart of method steps for accessing and utilizing ancillary data, in accordance with one embodiment of the present invention.

Referring now to FIG. 8, a flowchart of method steps for accessing and utilizing ancillary data 418 is shown, in accordance with one embodiment of the present invention. The FIG. 8 embodiment is presented for purposes of illustration, and in alternate embodiments, the present invention may readily utilize various other steps and sequences than those discussed in conjunction with the FIG. 8 embodiment.

In the FIG. 8 embodiment, initially, in step 810, one or more ancillary data files 418 may preferably be created by any appropriate entity and stored in a particular data source. For example, in one embodiment, a system user may create various ancillary data files 418 on a computer device for subsequent downloading and utilization by camera device 110. Alternately, a manufacturer may create various ancillary data files 418, and make the ancillary data files 418 available on a distributed computer network like the Internet for subsequent downloading and utilization by camera device 110.

In step 812, camera device 110 may preferably establish an electronic communication path with the particular data source in any appropriate manner to download one or more of the ancillary data files 418 that were created above in step 810. The foregoing electronic communication path between a data source and camera device 110 may be established using any effective technique. For example, camera device 110 may access and download one or more ancillary data files 418 using a removable non-volatile memory device, a hard-wired connection, or a wireless connection. Similarly, camera device 110 may access and download one or more ancillary data files 418 from a either a stand-alone electronic device, or a distributed computer network. The foregoing electronic communication may path be established using one or both of an automatic connection protocol or a user-initiated connection protocol.

In step 816, camera device 110 may perform various on-line management procedures with ancillary data files 418 by means of the electronic communication path established in foregoing step 812. The on-line management procedures may include any appropriate processes or functionalities. For example, a download manager 512 from ancillary data module 416 of camera device 110 may advantageously select and download one or more of the ancillary data files 418 that were created in foregoing step 810. In certain embodiments, a system user may interactively view, manipulate, select, and download ancillary data files 418 from the data source using appropriate respective data-source content review procedures and ancillary-data file download procedures.

In step 820, after download manager 512 preferably downloads and locally stores one or more selected ancillary data files 418, the electronic communication path between the data source and camera device 110 may be terminated. The foregoing electronic communication path may be terminated using one or both of an automatic termination protocol and a user-initiated termination protocol. Then, in step 826, ancillary data module 416 may preferably analyze the downloaded ancillary data file(s) 418 and coordinate any required off-line file management procedures, either automatically or through an interactive process with a system user.

In certain embodiments, ancillary data module 416 may preferably analyze one or more descriptors 712 corresponding to the downloaded ancillary data files 418 to identify relevant information regarding the downloaded ancillary data files 418. For example, ancillary data module 416 may assign each downloaded ancillary data file 418 to an appropriate file category, such as a template category, an overlay category, a background category, an Internet web page category, or an instructions category.

A display manager 420 may also update camera menus 424 in camera device 110 to include any changes in the locally-stored ancillary data files 418. In certain embodiments, a data manager 524 from ancillary data module 416 may preferably reorganize or delete local ancillary data files 418 in camera device 110, depending upon the particular type of downloaded ancillary data files 418.

Finally, in step 828, a system user may advantageously access and utilize ancillary data files 418 in camera device 110 by viewing one or more camera menus 424 on viewfinder 308. In certain embodiments, display manager 420 may display a selected ancillary data file 419 in viewfinder 308 while a system user positions and captures related image data. In alternate embodiments, editing module 520 from ancillary data module 416 may allow a system user to view and edit a combination image of selected ancillary data files 418 and selected captured images from data storage 422 of camera device 110.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An electronic device comprising:
    an ancillary module that transfers at least one ancillary file from a data source to said electronic device,
    said at least one ancillary file being selected and downloaded through selection decisions that are made by a system user, said selection decisions being made in all instances prior to said download of said at least one ancillary file, said at least one ancillary file being transferred from said data source to said electronic device by utilizing at least one of a wireless transmission and a physical connection,
    said data source being implemented as a computer in a distributed computer network, said at least one ancillary file including software instructions for said electronic device,
    said ancillary data module converting said at least one ancillary file from a first format to a second format,
    said ancillary data module performing one or more on-line management procedures regarding said converted at least one ancillary file while an active communication path exists from said electronic device to said computer; and
    a processor device that controls said ancillary module.

2. The electronic device of claim 1, wherein said at least one ancillary file includes at least one of an image template file, a text overlay file, an image background file, an Internet webpage file, and a program instruction file.

3. The electronic device of claim 1, wherein said electronic device includes at least one of a digital still camera device, a video camera device, and an electronic scanner device.

4. The electronic device of claim 1, wherein said ancillary module manipulates data by utilizing said software instructions to process image data to generate new composite data, said image data including still image data and video data.

5. The electronic device of claim 1, wherein said electronic device utilizes said software instructions to process stored data.

6. The electronic device of claim 1, wherein said electronic device is implemented as an imaging device configured to capture image data, said electronic device utilizing said software instructions to process said image data.

7. The electronic device of claim 1, wherein said electronic device utilizes said software instructions to provide enhanced functionality for said electronic device.

8. The electronic device of claim 1, wherein said ancillary module includes:
    a download manager for transferring ancillary files from said data source to an imaging device and analyzing said ancillary files,
    an editing module for combining one or more of said ancillary files with image data,
    a data manager for controlling and reorganizing said one or more of said ancillary files, and
    miscellaneous routines that include a conversion routine for translating said one or more of said ancillary files into a compatible format.

9. The electronic device of claim 1, wherein said at least one ancillary file includes a data portion and a corresponding descriptor tag that is analyzed by said ancillary module to identify, characterize, and categorize a corresponding ancillary file.

10. The electronic device of claim 1, wherein said electronic device establishes said active communication path to said data source, said active communication path being established by at least one of an automatic connection protocol and a user-initiated connection protocol.

11. The electronic device of claim 10, wherein said ancillary module performs said one or more on-line management procedures while said active communication path is available, said one or more on-line management procedures including at least one of a data-source content review and an ancillary file download procedure.

12. The electronic device of claim 11, wherein said ancillary module downloads a special instruction file that corresponds to said selected ancillary file, said special instruction file including information that instructs said electronic device how to correctly utilize said selected ancillary file, said special instruction file being formatted as at least one of an embedded instruction file that is embedded in said selected ancillary file and a discrete instruction file that is not embedded in said selected ancillary file.

13. The electronic device of claim 1, wherein said ancillary module performs an off-line management procedure with one or more ancillary files that have been downloaded from said data source, said off-line management procedure including a file descriptor identification procedure by which said ancillary module categorizes said one or more ancillary files, said electronic device responsively updating device menus to include said one or more ancillary files to thereby enable the system user to utilize said one or more ancillary files.

14. The electronic device of claim 13, wherein said off-line management procedure includes at least one of a file reorganization procedure and a file deletion procedure.

15. The electronic device of claim 14, wherein said electronic device utilizes an editing module from said ancillary module to effectively combine selected ones of said one or more ancillary files with one or more images from image data to thereby create a new composite image.

16. An electronic device comprising:
an ancillary module that transfers at least one ancillary file from a data source to said electronic device,
said data source being implemented as a computer in a distributed computer network, said at least one ancillary file including software instructions for said electronic device,
said ancillary data module performing one or more on-line management procedures regarding said ancillary data file while an active communication path exists from said electronic device to said computer,
said at least one ancillary file being selected and downloaded through selection decisions that are able to be made in all instances only by said system user, said selection decisions being made in all instances prior to said download of said at least one ancillary file, said at least one ancillary file being transferred from said data source to said electronic device by utilizing at least one of a wireless transmission and a physical connection; and
a processor device that controls said ancillary module.

17. A method for utilizing an electronic device, comprising:
transferring at least one ancillary file from a data source to said electronic device by utilizing an ancillary data module, said data source being implemented as a computer in a distributed computer network, said at least one ancillary file including software instructions for said electronic device,
said at least one ancillary file being selected and downloaded through selection decisions that are made in all instances by a system user, said selection decisions being made in all instances prior to said download of said at least one ancillary file, said at least one ancillary file being transferred from said data source to said electronic device by utilizing at least one of a wireless transmission and a physical connection;

converting said at least one ancillary file from a first format to a second format by utilizing said ancillary data module, said ancillary data module performing one or more on-line management procedures regarding said converted at least one ancillary data file while an active communication path exists from said electronic device to said computer; and providing a processor device that controls said ancillary module.

18. A mobile device comprising:

an ancillary data module that transfers at least one ancillary file from a data source to said mobile device, said data source being implemented as a computer in a distributed computer network, said at least one ancillary file including software instructions for said mobile device, said ancillary data module performing one or more on-line management procedures regarding said ancillary data files while an active communication path exists from said mobile device to said computer, said at least one ancillary file being selected and downloaded through selection decisions that are able to be made in all instances only by a system user, said selection decisions being made in all instances prior to said download of said at least one ancillary file, said at least one ancillary file being transferred from said data source to said mobile device by utilizing at least one of a wireless transmission and a physical connection; and a processor device that controls said ancillary module.

* * * * *